June 15, 1954 W. G. McCROSSEN 2,681,159
LOAD HANDLING EQUIPMENT
Filed Sept. 28, 1950

INVENTOR.
WILLIAM G. McCROSSEN
BY Gerald P. Welch
ATTORNEY

Patented June 15, 1954

2,681,159

UNITED STATES PATENT OFFICE 2,681,159

LOAD HANDLING EQUIPMENT

William George McCrossen, West Allis, Wis.

Application September 28, 1950, Serial No. 187,190

1 Claim. (Cl. 214—38)

This invention relates to improvements in load handling equipment and more particularly to novel load handling equipment including a demountable truck body, a stand therefor, and a truck adapted for placing and removing said truck body from said stand.

An object of the invention is to provide an assembly of stands or rests which will hold demountable truck bodies, the latter being so formed that they will receive the lift frame of a tractor truck preparatory to being lifted and removed from said rest or frame, and the said rests or frames being so formed as to admit a backing truck when said demountable body is to be deposited or removed.

Another object of the invention is to provide a demountable body having means subjoined thereto which will receive the lift frame of a tractor truck and which has means thereon for attachment of said body releasably to said tractor truck for transportation of the body contents.

Another object of the invention is to provide a frame or rest for a demountable truck body which is so constructed as to be particularly adapted to resist the stresses accompanying the backing of the truck into said frame to deposit or remove a demountable body.

Other and further objects of the invention will appear as the description proceeds, reference being had to the accompanying drawing, in which.

Figure 1:
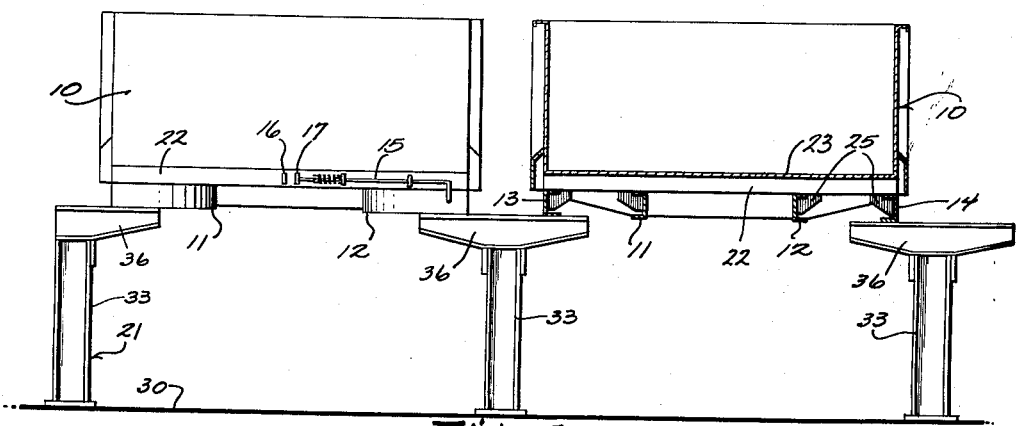
Fig. 1 is a front view partly in section and partly in elevation of a pair of demountable truck bodies on an assembly of frame rests.
Figures 2, 3:
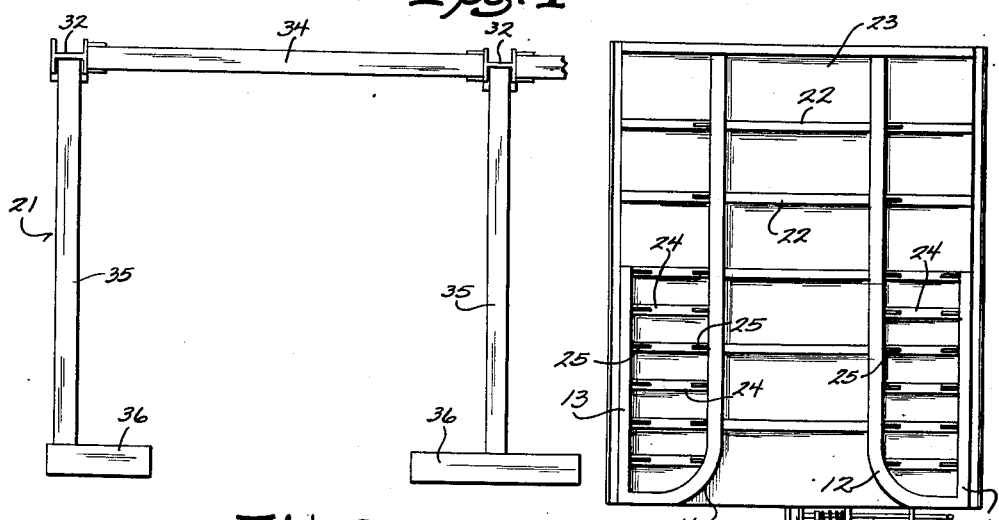
Fig. 2 is a plan view of one of the frame rests.
Fig. 3 is an inverted plan view of a demountable truck body.
Figure 4:
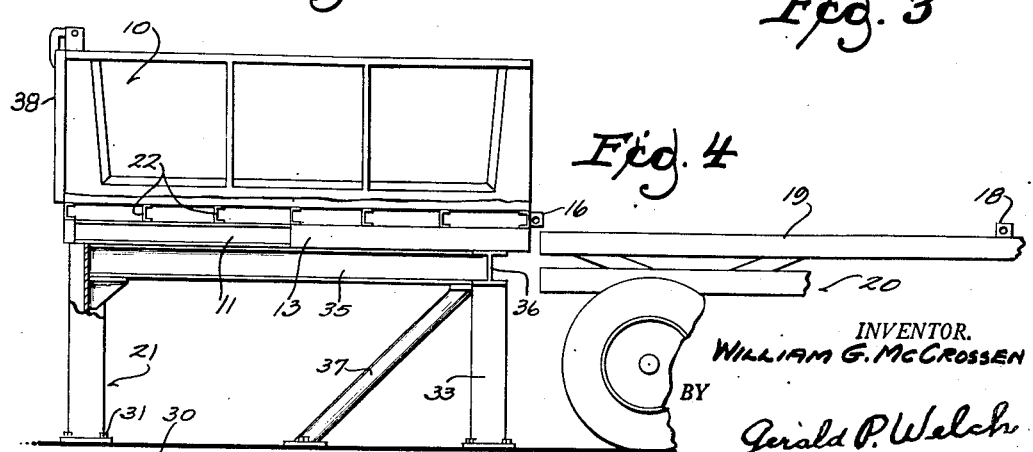
Fig. 4 is a side view in elevation of a demountable truck body on a frame rest with a fragmentary side view of a tractor truck being backed thereunder.

This case involves the structures referred to in my patent application, Serial No. 160,754, filed May 8, 1950, and now abandoned, for improvements in methods of load handling.

Referring more particularly to the drawing, the numeral 10 refers to a demountable truck box, having a base structure formed of a pair of guides 11 and 12 and the side members 13 and 14. A coupling pin 15 is moveable through the eyes 16 and 17 to engage an eye 18 on the lift frame 19 of a truck 20, when in proper position. The guide members 11 and 12 and the side members 13 and 14 are formed of C angle material. The guide members 11 and 12 are flared outwardly at their frontal ends to receive the lift frame 19 of the truck 20 when it is backed under the demountable body 10 as it rests on the frame 21. The demountable truck body 10 has a number of transverse girders 22 subjoined to its bottom 23. The guide members 11 and 12 and the side members 13 and 14 are subjoined to the girders 22 and a plurality of short channels 24 extend transversely of the truck bottom 23 connecting the guide members 11 and 12 with the side members 13 and 14. The channels 24 are reinforced by conventional gussets 25.

The guide members 11 and 12 for the greater portion of their lengths are spaced apart sufficiently to freely receive the lift frame 19 of the truck 20 as the latter is backed under the body 10.

The frame rest 21 is secured to a concrete slab 30 by threaded means 31 and includes rear uprights 32 and front uprights 33. A spanner girder 34 is carried upon the rear uprights 32. Side members 35 extend from the rear uprights 32 to the front uprights 33, surmounting the same. The front uprights 33 are topped by the laterally projecting brackets 36, and are backed by the diagonal bolster tubes 37.

In use, the box body 10 is designed to rest for the purpose of being loaded on the frame rest 21, and is deposited on the rest and removed therefrom by a truck 20, having a lift frame 19, which in the lower portion of its lift, maintains an even horizontal plane. The frame rest 21 is built higher than the low level of the lift frame 19. In order to deposit a body 10 for loading, the lift frame 19 is raised higher than the rest 21, and the truck 20 is backed between the brackets 36 until the rear end of the truck body is above the spanner girder 34. The lift mechanism is then lowered until the rear ends of the guides 11 and 12 rest on the girder 34, and the side elements 13 and 14 of the base frame rest on the brackets 36. The lift frame 19 is dropped a further distance whereupon the truck 20 may be driven away free of the body 10, which latter may then be loaded. When the body 10 has been loaded, a truck 20 may be backed between the brackets 36, so that its lift frame 19 will pass backwardly between the guide members 11 and 12, entering at the flared portions thereof. The lift frame 19 is then raised until the body 10 is clear of the rest frame 21, whereupon the truck 20 may be driven away with the body 10. It will be understood that the body 10 has a conventional dump gate 38, and that the lift frame 19 is capable of the conventional angular dumping movement.

It will be understood that the device is capable of many modifications in structure and design, without departing from the spirit of the invention, within the scope of the appended claim.

Having thus described the invention, what is claimed and desired to be secured by Letters Patent of the United States, is:

In combination with a truck having an elongated flat lift frame and means for raising said lift frame while maintaining the same on a horizontal plane, a fixed rest frame including a cross member at the rear thereof, side members and laterally inturned frontal supports, all on a common horizontal plane, said front supports being spaced apart to define a passageway therebetween for the horizontal and vertical movement of the lift frame in the rest frame, a demountable body adapted for placement on said rest frame and having a flat bottom structure adapted to rest on the rest frame and on the lift frame, laterally spaced, longitudinally extending guides attached to the underside of the bottom structure and forming a longitudinally extending channel for slidably receiving the lift frame, said channel being slightly wider than the lift frame and said guides locating the body on the lift frame, said guides having frontal ends flared horizontally arcuately outwardly to form a flared mouth on the channel to facilitate the backward entry of the lift frame into the channel between the guides, said bottom structure having a front end, a pair of side by side spaced apart apertured ears projecting forwardly from the front end, a latch rod slidably carried by the front end for movement transversely of the body and into and out of the apertured ears and an upstanding apertured ear on the upper surface of the lift frame, said lift frame in its backward guided movement in the channel between the guides moving said ear into position between the ears on the body to receive the latch rod.

References Cited in the file of this patent

UNITED STATES PATENTS

| Number | Name | Date |
|---|---|---|
| 1,524,473 | Brinton | Jan. 27, 1925 |
| 1,785,168 | Young | Dec. 16, 1930 |
| 1,870,573 | Kuchar | Aug. 9, 1932 |
| 1,923,785 | Holan | Aug. 22, 1933 |
| 1,985,169 | Howell et al. | Dec. 18, 1934 |
| 2,044,592 | Richards | June 16, 1936 |
| 2,151,640 | Menning | Mar. 21, 1939 |
| 2,379,094 | Maxon, Jr. | June 26, 1945 |